United States Patent
Tsujioka

(10) Patent No.: US 10,425,553 B2
(45) Date of Patent: Sep. 24, 2019

(54) MANAGING DEVICE INFORMATION TRANSMITTED TO EXTERNAL SYSTEMS

(71) Applicant: SEIKO EPSON CORPORATION, Tokyo (JP)

(72) Inventor: Nobuhiro Tsujioka, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 4 days.

(21) Appl. No.: 15/847,494

(22) Filed: Dec. 19, 2017

(65) Prior Publication Data

US 2018/0213110 A1 Jul. 26, 2018

(30) Foreign Application Priority Data

Jan. 20, 2017 (JP) .................... 2017-008211

(51) Int. Cl.
*H04N 1/32* (2006.01)
*H04N 1/00* (2006.01)

(52) U.S. Cl.
CPC ..... *H04N 1/32122* (2013.01); *H04N 1/00344* (2013.01); *H04N 2201/0039* (2013.01); *H04N 2201/0094* (2013.01); *H04N 2201/3204* (2013.01); *H04N 2201/3219* (2013.01); *H04N 2201/3273* (2013.01)

(58) Field of Classification Search
CPC ........... H04N 1/32122; H04N 1/00344; H04N 2201/0039; H04N 2201/0094; H04N 2201/3204; H04N 2201/3219; H04N 2201/3273
See application file for complete search history.

(56) References Cited

U.S. PATENT DOCUMENTS

| | | | | |
|---|---|---|---|---|
| 2006/0209359 A1* | 9/2006 | Kadowaki | .......... | H04N 1/00209 358/474 |
| 2007/0171470 A1* | 7/2007 | Fujii | .................. | H04N 1/00204 358/1.15 |
| 2012/0162683 A1* | 6/2012 | Kunihiro | .............. | G03G 15/502 358/1.13 |
| 2013/0286426 A1* | 10/2013 | Morovic | ............... | G06F 3/1222 358/1.14 |
| 2015/0092219 A1* | 4/2015 | Kanemoto | .............. | G06F 3/121 358/1.14 |
| 2015/0156370 A1* | 6/2015 | Ichikawa | ........... | H04N 1/32539 358/1.13 |
| 2017/0119252 A1* | 5/2017 | Kim | ..................... | A61B 5/0024 |
| 2018/0183952 A1* | 6/2018 | Imaoka | .............. | H04N 1/00411 |

FOREIGN PATENT DOCUMENTS

JP 2015-069415 A 4/2015

* cited by examiner

*Primary Examiner* — Iriana Cruz
(74) *Attorney, Agent, or Firm* — Workman Nydegger

(57) ABSTRACT

A device to be managed by a management device, the device includes a processor that receives selection of an item of device information to be transmitted to the management device out of device information of a plurality of items on the device; and a communication IF that transmits only device information of the selected item to the management device. The device further includes a display control section that displays a service provided in accordance with the selection of the device information.

8 Claims, 4 Drawing Sheets

MANAGING DEVICE INFORMATION TRANSMITTED TO EXTERNAL SYSTEMS

The entire disclosure of Japanese Patent Application No: 2017-008211, filed Jan. 20, 2017 is expressly incorporated by reference herein in its entirety.

BACKGROUND

1. Technical Field

The present invention relates to a device to be managed by a management device and a device information management program.

2. Related Art

When a printer is connected to a network, and information on the printer is uploaded to a management device connected to the network, it is possible for the management device to obtain the state of the printer under its management.

Also, a print system including a multifunction printer and a server with the following function is disclosed (refer to JP-A-2015-69415). In the print system, if the multifunction printer suspends printing due to the occurrence of an error, the multifunction printer uploads a job that has suspended the printing and error information identifying the error contents that caused the suspension to the server.

A user of a device, such as a printer, or the like sometimes did not connect the device to a network on purpose from anxiety on security (risk of information being exposed outside) and put the device into a state in which information on the device is unable to be uploaded to a management device. However, in such a situation, it is not possible for the management device to obtain the state of the device and to suitably control the device.

SUMMARY

An advantage of some aspects of the invention is that it provides a device and a device information management program that enable a user to build an environment in which suitable management (service) is provided while eliminating anxiety on security.

According to an embodiment of the invention, there is provided a device to be managed by a management device, the device including a processor that receives selection of an item of device information to be transmitted to the management device out of device information of a plurality of items on the device; and a communication IF that transmits only device information of the selected item to the management device.

With the configuration, it is possible for a user of the device to select an item of the device information allowed to be transmitted to the management device and transmit only the device information of the selected item to the management device. Accordingly, anxiety of the user on security is eliminated. Also, it is possible for the device to receive suitable management (service) in accordance with the transmitted device information.

In the device according to the embodiment of the invention, the device information of the plurality of items may include maintenance information on a component included in the device; status information including error information of the device; and job information on a job executed by the device. With the configuration, it is possible for the device to receive suitable management (service) in accordance with the information of the selected item out of the device information of the items, such as maintenance information, status information, and job information.

The device according to the embodiment of the invention may further include a display control section that displays a service provided in accordance with selection of an item of the device information on a display section. With the configuration, it is possible for a user to easily understand what service is provided if the user selects the item of which device information (if the user transmits which device information to the management device). The service may include any one of, for example, a call service to a user, remote setting of the device, a failure diagnosis of the device, a discount of consumables, and production management support regarding the device.

In the device according to the embodiment of the invention, the display control section may increase the number of displays of the provided services in accordance with an increase of the number of items of the selected device information. With the configuration, it is possible for the user to easily understand that if the number of items of device information to be transmitted to the management device is increased, the number of services provided is increased accordingly.

In the device according to the embodiment of the invention, the display control section may display the provided services in a specific display mode out of all the services in accordance with selection of an item of the device information while all the services provided are displayed on the display section in a visually recognizable manner when all of the device information of the plurality of items are selected. With the configuration, it is possible for the user to easily understand the relationship between selection of an item of device information and a provided service while recognizing all the services provided when all the items of the device information are selected.

In the device according to the embodiment of the invention, the display control section may change the display of the service on the display section in accordance with whether or not job information on a job executed by the device is selected as an item of the device information. With the configuration, it is possible for the user to understand that the provided services are changed by whether or not to select job information.

The technical ideas of the invention are realized in various modes in addition to the category of device. For example, the invention of a method corresponding to the processes executed by a device, the invention of a program (device information management program) that causes hardware (a computer) to perform those processes, and the invention of a computer-readable storage medium that stores the program are individually realized. Also, a system that includes a device and a management device is realized as the invention. Also, a terminal described later is realized as the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
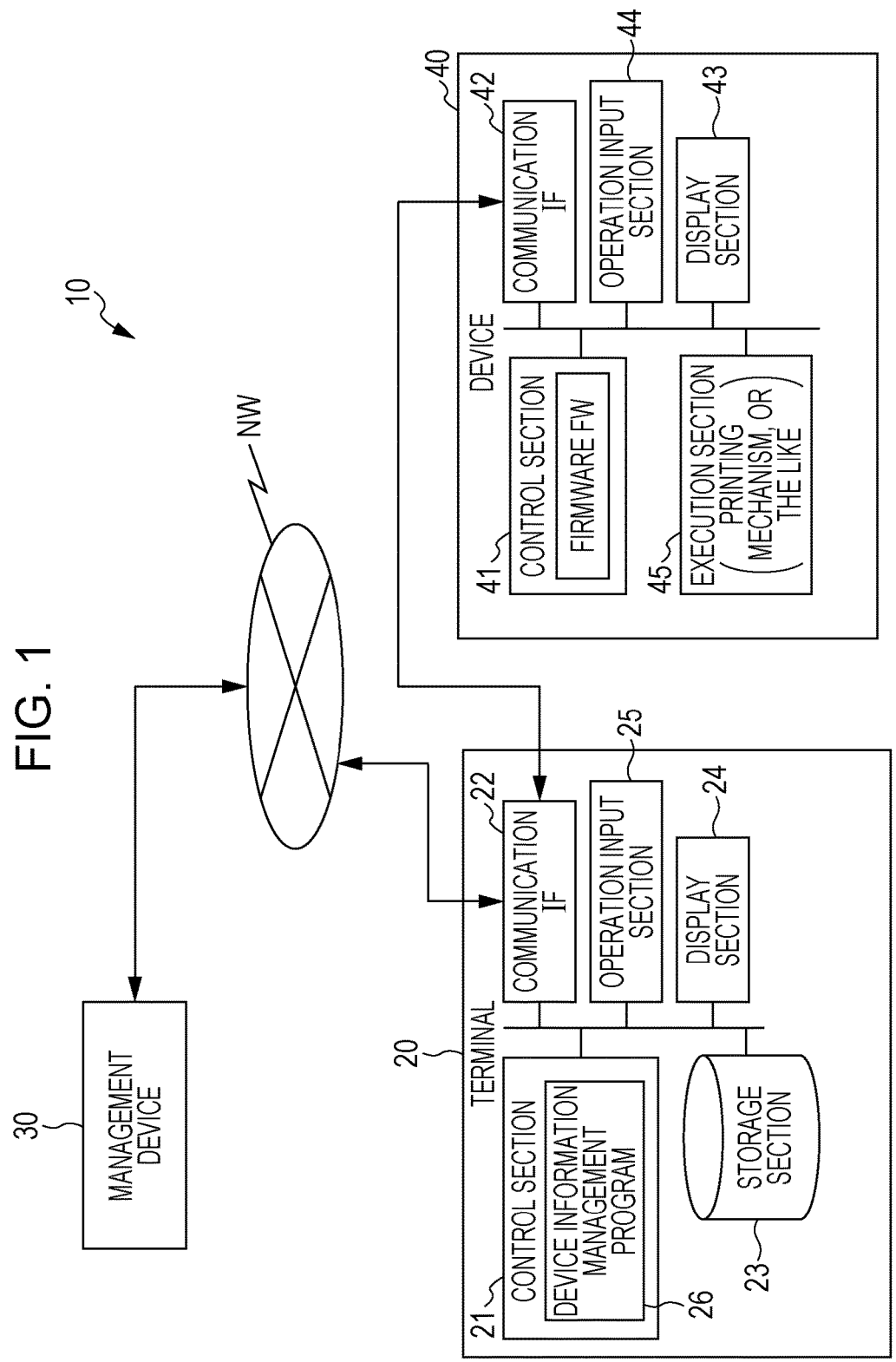
FIG. 1 is a diagram illustrating the configuration of a system in a simplified manner.

In the following, a description will be given of embodiments of the invention with reference to the drawings. In this regard, each of the drawings is only an example for illustrating the embodiments. FIG. 1 is a diagram illustrating the configuration of a system 10 in a simplified manner. The system 10 includes a management device 30 and a device 40 to be managed by the management device 30. Also, in the example in FIG. 1, the device 40 is locally connected to a terminal 20 that monitors the device 40 in a wired manner or a wireless manner, and the terminal 20 is considered to be part of the system 10.

The device 40 is, for example a printer. The printer is a device that functions at least as a printer, and may be a multifunction printer having a plurality of functions, such as a scanner, a facsimile, and the like. Note that the device 40 assumed in the present embodiment is not limited to a printer, and corresponds to various devices that are managed by the management device 30 by the information (device information) thereof being uploaded to the management device 30. The whole of or a part of the system 10 may be referred to as a device management system, or the like.

The terminal 20 and the management device 30 have respective network communication functions and are capable of communicating with each other via a network NW. The network NW may include a local area network (LAN) or the Internet. The network NW may be a wired network or a wireless network. When the network NW includes the Internet, the management device 30 is said to be a server that provides a cloud service via the Internet. For example, the management device 30 is realized by one or a plurality of information processing devices that function as servers. Also, the management device 30 is a device handled by a person who performs overall control and operation of the system 10 (for example, a provider that provides the cloud service). On the other hand, the device 40 and the terminal 20 are devices that are handled by a user of the device 40.

The terminal 20 is realized by, for example a personal computer (PC) or a terminal having the same performance as a PC. The terminal 20 includes a control section 21, a communication interface (IF) 22, a storage section 23, a display section 24, an operation input section 25, and the like. The control section 21 includes, for example an IC including a CPU, a ROM, a RAM, and the like, and the other memories, and the like. In the control section 21, the CPU performs calculation processing in accordance with a program stored in the ROM, or the like using the RAM, or the like as a work area so as to realize various kinds of processing, such as receiving selection of items of the device information described later, uploading the device information, and displaying a user interface (UI) screen, and the like. In the control section 21, a device information management program 26 is installed as a kind of such programs.

The communication IF 22 is an interface (IF) that performs communication with the outside by conforming to a predetermined communication standard including a publicly known communication standard. The storage section 23 includes a storage device, such as a hard disk drive, a flash memory, or the like, or constituted by a part of the control section 21. The storage section 23 stores device information obtained from the device 40 to be monitored, and the like.

The display section 24 is a mechanism for displaying visual information and includes, for example a liquid crystal display (LCD), an organic EL display, or the like. The display section 24 may have a configuration including a display and a drive circuit for driving the display. The operation input section 25 is a mechanism for receiving input of operation by a user and is realized by, for example, a touch panel, a physical button, a mouse, a keyboard, or the like. The display section 24 is capable of functioning as such a touch panel as a matter of course. The display section 24 and the operation input section 25 may be external peripheral devices of the terminal 20.

The device 40 includes a control section 41, a communication IF 42, a display section 43, an operation input section 44, an execution section 45, and the like. The control section 41 consists of an IC including, for example, a CPU, a ROM, a RAM, and the like, and the other memory, and the like. In the control section 41, the CPU performs calculation processing in accordance with firmware FW stored in the ROM, and the like using the RAM, or the like as a work area so as to control operation of each section of the device 40 including the execution section 45. It is possible to apply the above description on the communication IF 22, the display section 24, and the operation input section 25 to a basic description of the communication IF 42, the display section 43, and the operation input section 44 respectively.

In the case where the device 40 is a printer, the execution section 45 includes a printing mechanism that performs print operation in accordance with print data. Also, the execution section 45 is a general term of individual mechanisms for specifically realizing various respective functions of the device 40 (multifunction printer), in addition to the printing mechanism, such as a scanner section that optically reads document text to generate image data, a facsimile communication section capable of performing facsimile communication (transmission and reception), an email communication section capable of performing email communication (transmission and reception), and the like. The configuration of the printing mechanism, the scanner section, the facsimile communication section, the email communication section, and the like are publicly known, and thus the detailed description thereof will be omitted.

A combination of the device 40 and the terminal 20 that obtains the device information of the device 40 and uploads the device information to the management device 30 may be regarded as a device according to the invention. Also, although such a device is omitted in FIG. 1, a plurality of devices may exist.

Figure 2:
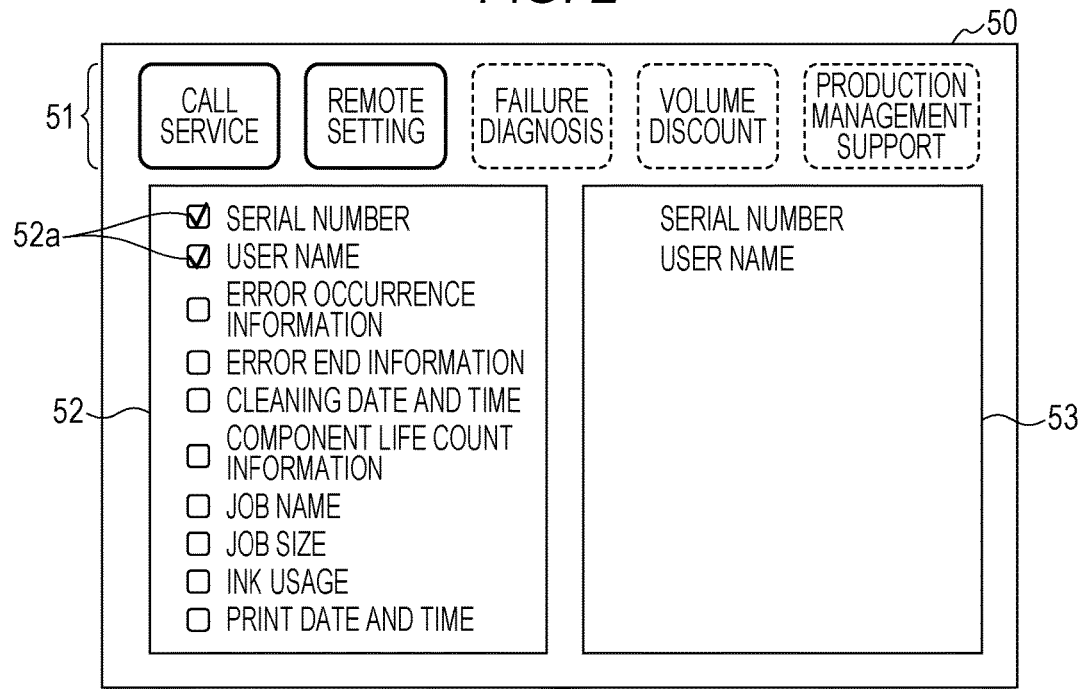
FIG. 2 is a diagram illustrating an example of a UI screen.
Figure 3:
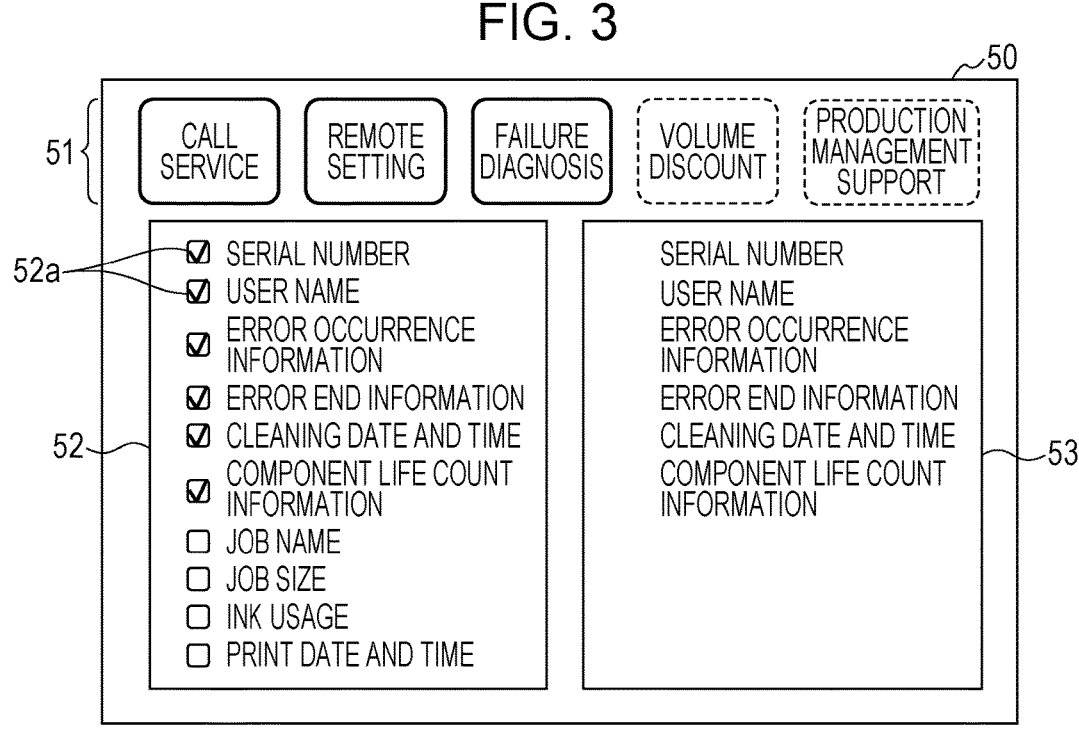
FIG. 3 is a diagram illustrating an example of a UI screen.
Figure 4:
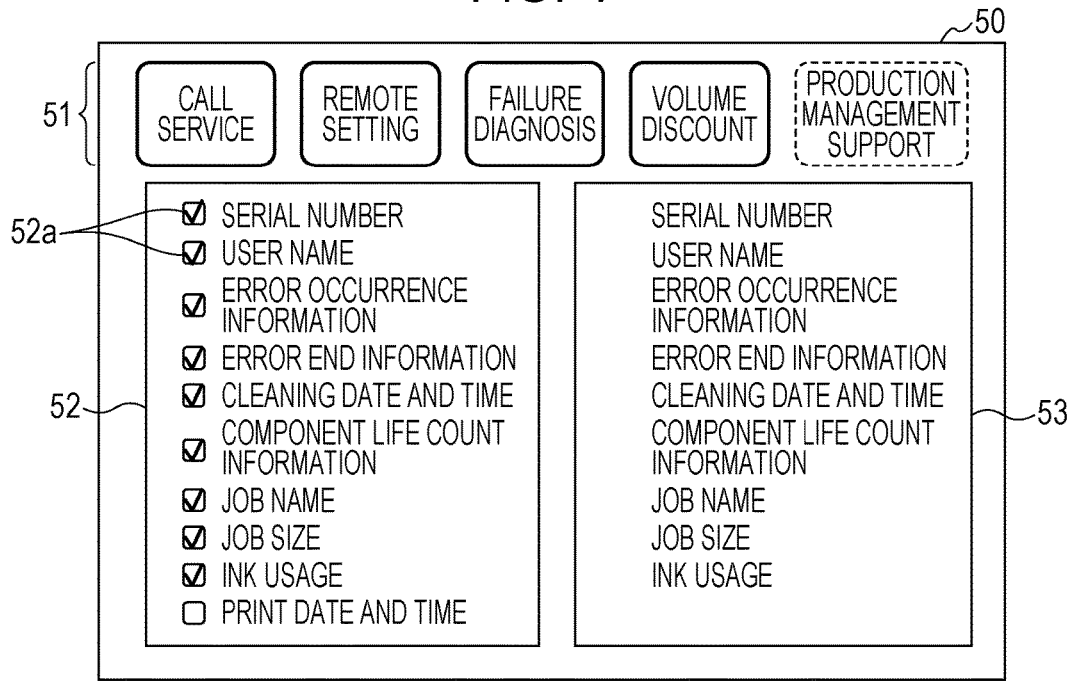
FIG. 4 is a diagram illustrating an example of a UI screen.

FIGS. 2, 3, and 4 illustrate an example of a UI screen 50 that is displayed on the display section 24 by the control section 21 of the terminal 20 that executes the device information management program 26. The UI screen 50 includes, for example a service display field 51, a monitoring information display field 52, an upload information display field 53, and the like.

In the monitoring information display field 52, items (types of device information) of the device information on the device 40 is displayed. Examples of the items of device information include a serial number, a user name, error occurrence information, error end information, cleaning date and time, component life count information, a job name, a job size, ink usage, print date and time, and the like.

A serial number is a specific number for each individual device 40. A user name is, for example a name of an individual or a corporation who uses the device 40. Error occurrence information is information indicating the date and time when an error occurred in the device 40 and the contents of the error. Error end information is information indicating the date and time when an error is eliminated, and the like. Error occurrence information and error end information may be collectively referred to as error information. Also, error information is a type of status information indicating the state of the device 40.

Cleaning date and time is information indicating the date and time when cleaning of an ink jet-type recording head of the execution section 45 (printing mechanism) was performed, cleaning history, and the like. Component life count information is information directly or indirectly indicating the life of a component of the execution section 45 (timing at which exchange becomes necessary). For example, if the number of times of use of the component up to its life has an upper limit, the number of times of use up to now corresponds to component life count information. Cleaning date and time and component life count information are kinds of maintenance information of the components included in the device 40.

A job name is a name (file name, or the like) for each job (for example, a print job executed by the printing mechanism) performed by the execution section 45. A job size is information indicating the size of a job, and in the case of a print job, the job size is, for example a product of the size of paper and the number of copies. Ink usage is the amount of ink used for each print job. A job name, a job size, and ink usage may be collectively referred to as job information. Print date and time is the date and time of print execution by the execution section 45 (printing mechanism) for each print job. In this regard, the items of device information on the device 40 are not limited to the items described above.

The control section 21 obtains the device information of the various items described above from the device 40 by communicating with the device 40 regularly or randomly and stores the obtained device information in the storage section 23. Also, the control section 21 displays the UI screen 50 as illustrated in FIGS. 2, 3, and 4 on the display section 24 in accordance with operation of the terminal 20 by the user separately from obtaining and storing such device information. The monitoring information display field 52 (and the upload information display field 53) of the UI screen 50 indicates an item (type) of the device information, and does not indicate specific contents (for example, a job name itself) for each item. Of course, it is possible for the terminal 20 to receive operation by the user and to display the specific contents of the device information for each of the items in accordance with the information stored in the storage section 23 on the display section 24.

It is possible for the user to select whether or not to upload device information of the plurality of items on the device 40 to the management device 30 for each item in any way. For example, the monitoring information display field 52 is provided with a checkbox 52a for each item of the device information. It is possible for the user to operate the operation input section 25 so as to check the checkbox 52a in any way to select an item of the device information. The control section 21 recognizes that the checked items of the device information are the items allowed to be uploaded, and displays only the checked items of the device information in the upload information display field 53 on the UI screen 50. In this manner, the control section 21, the display section 24, and the operation input section 25 are said to function as the selection reception section that receives selection of an item of the device information to be transmitted to the management device 30 among the device information of the plurality of items on the device in that they receive selection of an item of the device information via the UI screen 50.

In the example in FIG. 2, the items of a serial number and a user name are selected out of the items of the device information in the monitoring information display field 52, and as a result of the selection, the items of a serial number and a user name are displayed as the items in the upload information display field 53. In the example in FIG. 3, the items of a serial number, a user name, error occurrence information, error end information, cleaning date and time, and component life count information are selected out of the items of the device information in the monitoring information display field 52, and as a result of the selection, the items of a serial number, a user name, error occurrence information, error end information, cleaning date and time, and component life count information are displayed as the items in the upload information display field 53. In the example in FIG. 4, the items of a serial number, a user name, error occurrence information, error end information, cleaning date and time, component life count information, a job name, a job size, and ink usage are selected out of the items of the device information in the monitoring information display field 52, and as a result of the selection, the items of a serial number, a user name, error occurrence information, error end information, cleaning date and time, component life count information, a job name, a job size, and ink usage are displayed as the items of the upload information display field 53.

It is possible for the user to reduce the number of the items in the selected state in the monitoring information display field 52. For example, on the UI screen 50 in the state illustrated in FIG. 4, when the user unchecks the individual checkboxes 52a of a job name, a job size, and ink usage in the monitoring information display field 52, the control section 21 deletes the items of a job name, a job size, and ink usage from the upload information display field 53 simultaneously with the operation. Thereby, the UI screen 50 changes from the state illustrated in FIG. 4 to the state illustrated in FIG. 3.

The control section 21 transmits only the device information of the items selected in the monitoring information display field 52 (displayed in the upload information display field 53) to the management device 30 via the network NW. That is to say, the control section 21 identifies items of the device information to be transmitted to the management device 30 in accordance with the latest selected state of the individual items of the device information by the user operation in the monitoring information display field 52, reads the device information of the identified item from the storage section 23, and uploads the device information to the management device 30. The control section 21 and the communication IF 22 are said to function as the transmission control section in that they transmit only the device information of the selected item to the management device 30 in this manner.

It is possible for the management device 30 (provider) to obtain the state of the device 40 in accordance with the device information uploaded from the device 40 (the terminal 20 that monitors the device 40), and to provide the device with various services in accordance with the state. However, the things that can be obtained by the management device 30 change in accordance with the items of the device information uploaded to the management device, and thus the contents of the service provided from the management device 30 are changed in accordance with the uploaded device information.

As exemplified in FIGS. 2, 3, and 4, a plurality of services allowed to be provided to the device are displayed in a visible manner in the service display field 51 of the UI screen 50. The plurality of services include, for example, a call service, remote setting, a failure diagnosis, a volume discount, production management support, and the like.

A call service is a service in which an operator of the management device 30 (provider) talks on the telephone with a user of the device 40 so as to teach how to operate the device 40, how to resolve a trouble, and the like. Remote setting is a service in which the setting of the device 40 is automatically changed or updated from the management device 30 by the communication with the device (terminal 20 and device 40). A failure diagnosis is a service in which the management device 30 diagnoses whether or not a failure has occurred in the device 40 and the cause of the failure in accordance with the device information, and notifies the device (the terminal 20 and the device 40) of a diagnostic result. A volume discount is a service for discounting the prices of consumables (printing sheet and ink) that are delivered from a provider to the user of the device 40 in accordance with the amount of printing (the number of copies, and the like) used by the device 40, which is obtained by the management device 30. A production management support is a service in which the management device 30 diagnoses the use state of the device 40 in accordance with the device information, and proposes or instructs the most suitable use state (for example, a time slot in which the device 40 is operated, and the like) in order to improve the productivity of the device (the terminal 20 and the device 40).

In the system 10, a relationship between the device information of an item, which is transmitted to the management device 30, and a service to be provided (enabled) is determined in advance, and thus the control section 21 (the device information management program 26) has the information of the relationship between such an item of device information and a service to be enabled in advance.

For example, if a serial number and a user name of the device 40 are uploaded to the management device 30, a call service and remote setting are provided. Also, if a serial number, a user name, error occurrence information, error end information, cleaning date and time, and component life count information of the device 40 are uploaded to the management device 30, a call service, remote setting and a failure diagnosis are provided.

Also, if a serial number, a user name, error occurrence information, error end information, cleaning date and time, component life count information, a job name, a job size, and ink usage of the device 40 are uploaded to the management device 30, a call service, remote setting, a failure diagnosis, and a volume discount are provided. Also, if all of the items that can be selected in the monitoring information display field 52, that is to say, in the examples in FIGS. 2, 3, and 4, a serial number, a user name, error occurrence information, error end information, cleaning date and time, component life count information, a job name, a job size, ink usage, and print date and time of the device 40 are uploaded to the management device 30, a call service, remote setting, a failure diagnosis, a volume discount, and a production management support are provided.

That is to say, basically, the number of services to be provided increases as the number of items of the device information uploaded to the management device 30 increases.

When the control section 21 displays the UI screen 50, the control section 21 displays provided services in the service display field 51 simultaneously with the selected state of the items of the device information in the monitoring information display field 52.

In the example in FIG. 2, a serial number and a user name are selected among the items of the device information in the monitoring information display field 52. Accordingly, the control section 21 displays a call service and remote setting, which are services that are enabled when a serial number and a user name are uploaded to the management device 30, in the service display field 51. In the example in FIG. 2, in the service display field 51, among a call service, remote setting, a failure diagnosis, a volume discount, and production management support that are visible by the user, the call service and the remote setting are displayed in the obviously emphasized mode compared with the other services (a failure diagnosis, a volume discount, and production management support). The control section 21 changes and emphasizes the color, the brightness, the thickness, and the size of a character, and the like of the display of the services that are enabled correspondingly to the items of the selected device information than the display of the other services.

In the example in FIG. 3, in the monitoring information display field 52, a serial number, a user name, error occurrence information, error end information, cleaning date and time, and component life count information are selected among the items of the device information. Accordingly, the control section 21 displays a call service, remote setting, and a failure diagnosis, which are services that are enabled when a serial number, a user name, error occurrence information, error end information, cleaning date and time, and component life count information are uploaded to the management device, in the service display field 51. In the example in FIG. 3, in the service display field 51, among a call service, remote setting, a failure diagnosis, a volume discount, production management support that are visible by the user, the call service, the remote setting, and the failure diagnosis are displayed in the obviously emphasized mode compared with the other services (a volume discount, and production management support).

In the example in FIG. 4, in the monitoring information display field 52, a serial number, a user name, error occurrence information, error end information, cleaning date and time, component life count information, a job name, a job size, and ink usage are selected among the items of the device information. Accordingly, the control section 21 displays a call service, remote setting, a failure diagnosis, and a volume discount, which are services that are enabled when a serial number, a user name, error occurrence information, error end information, cleaning date and time, component life count information, a job name, a job size, and ink usage are uploaded to the management device 30 in the service display field 51. In the example in FIG. 4, in the service display field 51, among a call service, remote setting, a failure diagnosis, a volume discount, production management support that are visible by the user, a call service, remote setting, a failure diagnosis, and a volume discount are displayed in the obviously emphasized mode compared with the other service (production management support).

The control section 21 is said to function as the display control section that displays provided services on the display section 24 in accordance with the selection of the items of the device information in that the control section 21 displays the UI screen 50 including the service display field 51 on the display section 24. Also, in the examples in FIGS. 2, 3, and 4, the control section 21 may display the provided services in a specific display mode (emphasized mode) out of all the services in accordance with the selection of an item of the device information while all the services provided are displayed on the display section 24 in a visually recognizable manner when all of the device information of the plurality of items are selected.

Further, as a specific example, the control section 21 may change the display of the service (change whether or not to display the volume discount as an enabled service (refer to FIGS. 3 and 4)) on the display section 24 in accordance with whether or not job information (a job name, a job size, and ink usage) on a job executed by the device 40 is selected as an item of the device information.

Figure 5:
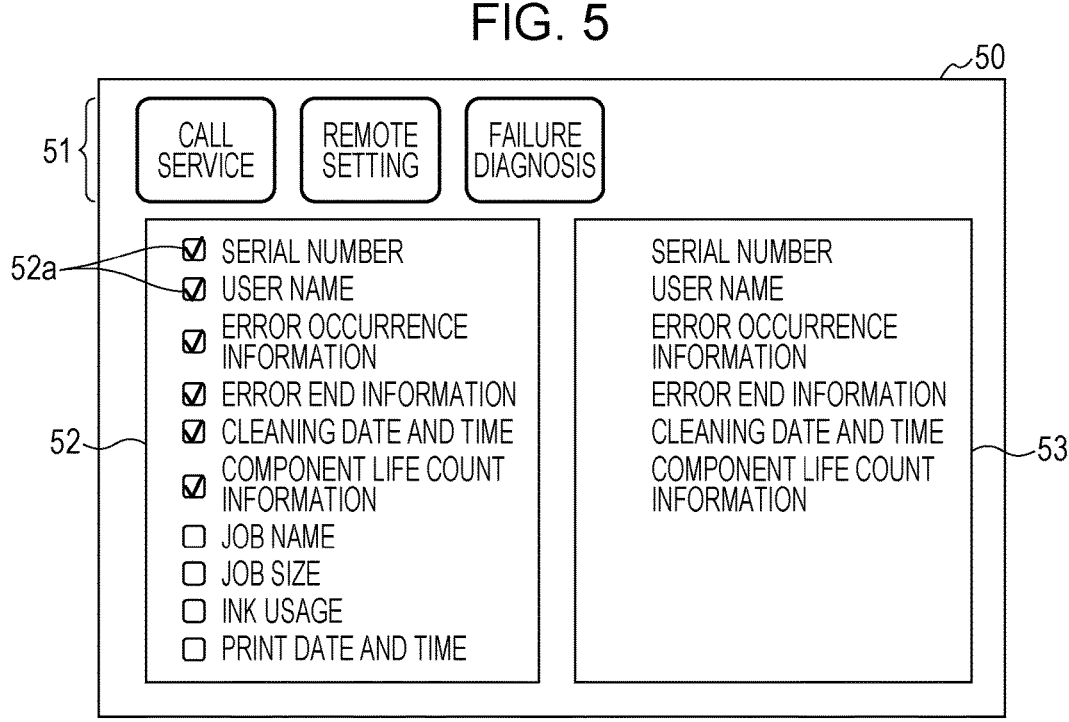
FIG. 5 is a diagram illustrating an example of a UI screen.

FIG. 5 illustrates an example of the UI screen 50 that is displayed on the display section 24 by the control section 21 of the terminal 20 that executes the device information management program 26. In the example in FIG. 5, in the same manner as FIG. 3, in the monitoring information display field 52, a serial number, a user name, error occurrence information, error end information, cleaning date and time, and component life count information are selected among the items of the device information, and thus the items of a serial number, a user name, error occurrence information, error end information, cleaning date and time, and component life count information are selected as the items in the upload information display field 53. Here, the control section 21 may display only the provided services in the service display field 51 simultaneously with the selected state of the items of the device information in the monitoring information display field 52 when displaying the provided services in the service display field 51 in the same manner as the example in FIG. 5.

That is to say, when a serial number, a user name, error occurrence information, error end information, cleaning date and time, and component life count information are selected among the items of the device information in the monitoring information display field 52, the control section 21 displays only a call service, remote setting, and a failure diagnosis, which are services enabled at that time in the service display field 51. Also, for example, when a serial number, and a user name are selected in the monitoring information display field 52, the control section 21 displays only a call service and remote setting, which are services enabled at that time, in the service display field 51. In other words, it is not absolutely necessary to display the services not provided at that time in a visible manner (in a more unnoticeable mode than that of the provided services) as illustrated in the examples in FIGS. 2, 3, and 4. When the service display field 51 is illustrated as in FIG. 5, the control section 21 increases the number of displays of the provided services in accordance with an increase of the number of selected items of the device information.

Figure 6:
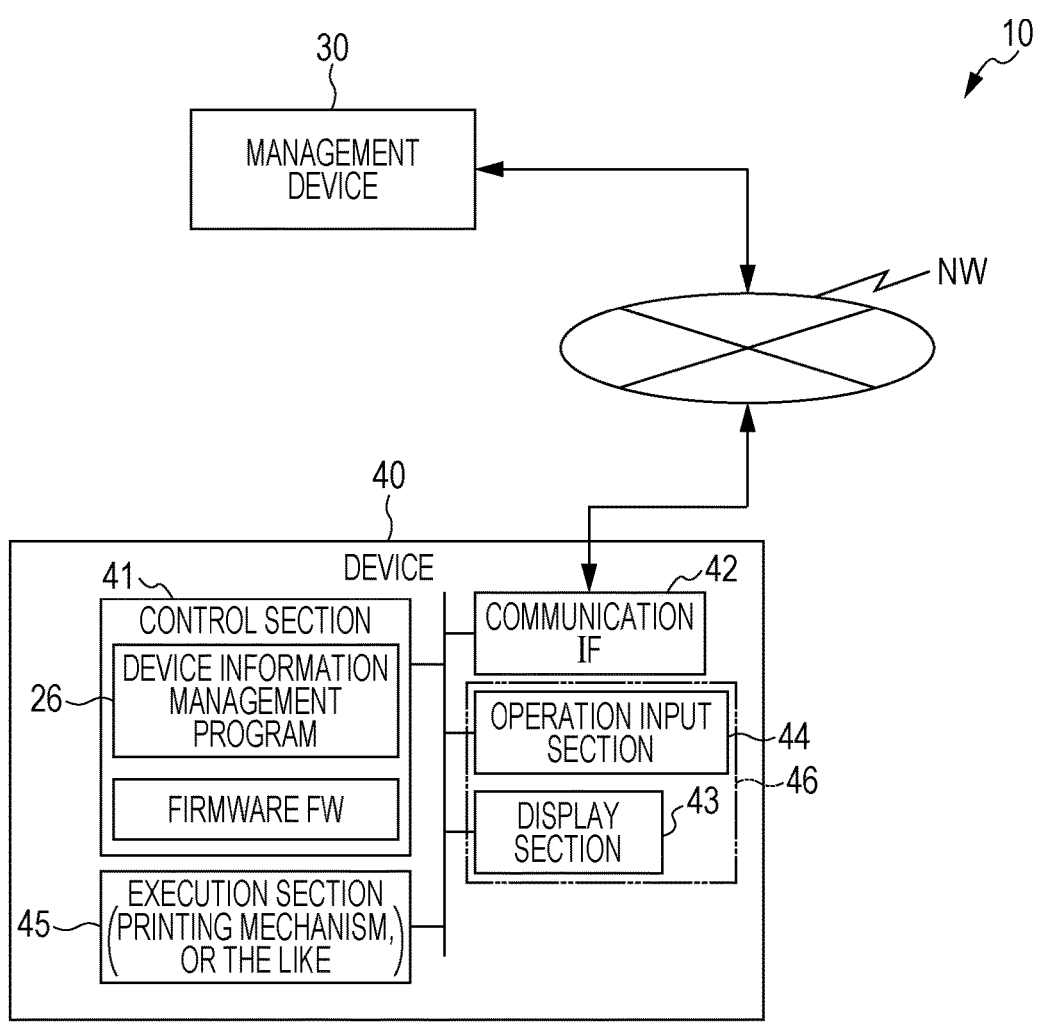
FIG. 6 is a diagram illustrating another example of the configuration of a system in a simplified manner.

FIG. 6 illustrates another example of the configuration of the system 10 in a simplified manner. In FIG. 6, the description of the components that are common to FIG. 1 are omitted. In the example in FIG. 6, the communication IF 42 in the device 40 has a network communication function and capable of mutually communicating with the management device 30 via the network NW. That is to say, in the system 10, the terminal 20 is not absolutely necessary, and thus a configuration in which the role of the terminal 20 described so far is played by the device 40 itself is also included in the present embodiment.

In the example in FIG. 6, the device information management program 26 is installed in the device 40, and the control section 41 executes the device information management program 26. Thereby, the control section 41 collects the device information of itself (the device 40), stores the device information, and displays the UI screen 50 described above on the display section 43. The control section 41 then receives operation (selection of the items of the device information) on the UI screen 50, that is to say, user's operation on the operation input section 44, and changes the display on the UI screen 50 in accordance with the selection (refer to FIGS. 2, 3, 4, and 5). Also, the control section 41 uploads the device information of the selected item to the management device 30.

Further, in the configuration in FIG. 6, the display section 43 and the operation input section 44 may be realized by the display function and the input function of a terminal 46 that can be carried by a user (for example, a tablet-type terminal, a smartphone, or the like). The terminal 46 is wiredly or wirelessly connected to the device 40, and an application installed on the terminal 46 displays the UI screen 50 on the display section of the terminal 46. The user then operates the terminal 46 so as to select an item of the device information on the UI screen 50 displayed by the terminal 46 as described above. A selection result of the item of the device information is notified from the terminal 46 (application) to the control section 41 of the device 40, and the control section 41 uploads the device information to the management device 30 in accordance with the notification. In this case, at least a part of the functions of the device information management program 26 is said to be realized by the application of the terminal 46.

In this manner, with the present embodiment, a device to be managed by the management device 30 receives selection of an item of the device information to be transmitted to the management device 30 among the device information of a plurality of items, and transmits only the device information of the selected item to the management device 30. That is to say, it is possible for the user of the device to select an item of the device information that may be transmitted to the management device 30 from judgment regarding security, and to upload only the device information of the selected item to the management device 30. Accordingly, anxiety of the user on security is eliminated, and it is possible for the device to receive suitable management (service) in accordance with the transmitted device information. For example, it is possible for the user not to select job information in the monitoring information display field 52 in consideration of the risk of information leakage caused by transmission of job information to the outside so that the user can select to receive only the services of a call service, remote setting, and a failure diagnosis. On the other hand, if a user actively attempts cost reduction of his or her business, it is possible for the user to select job information in the monitoring information display field 52 so as to further receive the service of a volume discount.

Further, with the present embodiment, the device displays services in accordance with selection of the items of the device information on the display section (displays the UI screen 50 including the service display field 51 on the display section). Thereby, it is possible for the user to easily understand what service is provided if which item of the device information is selected (which device information is transmitted to the management device 30), and to most suitably customize the types of the services to receive in consideration of a security risk.

The services to be provided are not limited the services described above. For example, it is possible for the management device 30 to obtain the amount of ink consumption in the device 40 in accordance with the device information, and to provide the user with a service (automatic ink ordering) for automatically ordering ink before the ink cartridge mounted on the device 40 becomes empty, and shipping the ink to the user. The automatic ink ordering is a service that is enabled if, for example job information of the device 40 is uploaded to the management device 30. Accordingly, it is possible for the control section 21 or the control section 41 to change the display of the services on the display section 24 or the display section 43 (change whether or not to display the automatic ink ordering as an enabled service) in accordance with whether or not the job information is selected as an item of the device information in the monitoring information display field 52.

Also, if a predetermined condition is satisfied, the control section 21 or the control section 41 may automatically transmit the device information of a predetermined item to the management device 30 regardless of the selected state of items of the device information by the user. The predetermined condition is, for example the occurrence of an error in the device 40. If an error occurs in the device 40, the control section 21 or the control section 41 automatically uploads, for example the job information regarding the print job that has been executed by the device 40 at the time of the occurrence of an error or before the occurrence of an error to the management device 30 regardless of whether or not the job information is selected in the monitoring information display field 52. With such a configuration, it is possible for the management device 30 to analyze the details of the error that has occurred in the device 40 and to provide the device 40 with more suitable support.

What is claimed is:

1. A device to be managed by a management device, the device having one or more functions, at least one of the one or more functions being a printing function, the device comprising:
   a user interface that displays a list of selectable items corresponding to different types of device information of the device;
   a processor that receives selection of a combination of one or more item(s) from the list of selectable items displayed by the user interface, the selected item(s) being selected for transmission to the management device, wherein, as a result of the selected item(s) being selected, the user interface is updated to display an indication of a service, offered by the management device, that corresponds to the selected item(s); and
   a network communication interface (IF) that transmits only device information of the selected item(s) to the management device via a network, and receives from the management device the corresponding service that changes in accordance with the combination of items that are selected from the list displayed on the user interface.

2. The device according to claim 1, wherein the different types of device information include maintenance information on a component included in the device, status information including error information of the device, and job information on a job executed by the device.

3. The device according to claim 1, further comprising:
   a display control section that displays the user interface on a display section.

4. The device according to claim 3, wherein the display control section causes additional service indications to be displayed in accordance with an increase in a number of items that are selected from the list.

5. The device according to claim 3, wherein the indication of the service is one of a plurality of service indications that are displayed on the user interface, and wherein one or more service indications in the plurality of service indications are displayed in a first manner while one or more other service indications in the plurality of service indications are displayed in a second manner.

6. The device according to claim 3, wherein the display control section changes an appearance of the indication of the service in accordance with whether or not job information of a job executed by the device is selected from within the list of selectable items.

7. The device according to claim 3, wherein the service includes any one of a call service to a user, a remote setting of the device, a failure diagnosis of the device, a discount of consumables, or a production management support regarding the device.

8. A non-transitory computer-readable computer medium storing a device information management program that causes a device to perform functions comprising:
   displaying a user interface that displays a list of selectable items corresponding to different types of device information of the device;
   receiving selection of a combination of one or more item(s) from the list of selectable items displayed by the user interface, the selected item(s) being selected for transmission to a management device, wherein, as a result of the selected item being selected, the user interface is updated to display an indication of a service, offered by the management device, that corresponds to the selected item;
   transmitting only device information of the selected item to the management device; and
   receiving from the management device the corresponding service that changes in accordance with the combination of items that are selected from the list displayed on the user interface.

* * * * *